US 3,205,230
Patented Sept. 7, 1965

3,205,230
3-SUBSTITUTED-5,6,7,8,9,10-HEXAHYDRO-
CYCLOOCTA[c]PYRIDAZINES
Edward Joseph Pribyl, Metuchen, and Chester Frank
Turk, Elizabeth, N.J., assignors to Olin Mathieson
Chemical Corporation, New York, N.Y., a corporation
of Virginia
No Drawing. Filed Sept. 14, 1962, Ser. No. 223,813
10 Claims. (Cl. 260—250)

This invention relates to 3-substituted-5,6,7,8,9,10-hexahydrocycloocta[c]pyridazines. More particularly, the invention relates to bases of the formula (I) 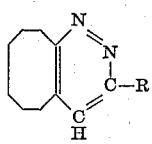

and to acid addition salts thereof.

R in Formula I represents halogen, thiol, amino or one of the following basic groups:

(II) 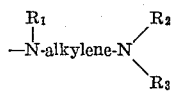

(III) 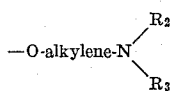

$R_1$ represents hydrogen or lower alkyl, of which the former is preferred.

$R_2$ and $R_3$, which may be the same or different, each represents hydrogen, lower alkyl, hydroxy-lower alkyl or phenyl-lower alkyl. In addition, the nitrogen may join with the groups represented by $R_2$ and $R_3$ to form a 5 to 7 membered monocyclic heterocyclic containing, if desired, an oxygen, sulfur or an additional nitrogen atom. That is, the two symbols $R_2$ and $R_3$ together represent a tetramethylene, pentamethylene, hexamethylene, oxapentamethylene, oxatetramethylene, azahexamethylene, azatetramethylene, azapentamethylene, thiapentamethylene or thiatetramethylene. The heterocyclic group may also be substituted by one or two lower alkyl, halogen or nitro substituents.

R includes the four halogens chlorine, bromine, iodine and fluorine, but chlorine and bromine are preferred. The alkyl groups included in the symbols $R_1$, $R_2$ and $R_3$ are straight or branched chain saturated aliphatic groups containing up to about 12 carbons. Lower alkyl groups such as methyl, ethyl, propyl, isopropyl, butyl, t-butyl, amyl and the like, are, however, preferred. The alkylene chains in the basic substituents are straight or branched chain saturated aliphatic groups of the same character of which lower alkylene is also preferred.

The basic, nitrogen containing radical (IV) 

which forms part of groups II and III above include, for example, lower alkylamino, e.g. methylamino, ethylamino, di(lower alkyl)amino, e.g. dimethylamino, diethylamino, dipropylamino, (hydroxy-lower alkyl)amino, e.g. hydroxyethylamino, di(hydroxy-lower alkyl)amino, e.g. di(hydroxyethyl)amino, phenyl(lower alkyl)amino, e.g. benzylamino, phenethylamino, N-(lower alkyl)-phenyl (lower alkyl)amino, e.g. N-methylbenzylamino, and the like. Di-lower alkylamino groups are preferred.

Heterocyclic groups represented by the radical IV include for example, piperidino, (lower alkyl piperidino, e.g. methylpiperidino, di(lower alkyl)piperidino, e.g. dimethylpiperidino, (lower alkoxy)piperidino, e.g. methoxypiperidino, pyrrolidino, (lower alkyl)pyrrolidino, e.g. methylpyrrolidino, di(lower alkyl)pyrrolidino, e.g. dimethylpyrrolidino, (lower alkoxy)pyrrolidino, e.g. ethoxypyrrolidino, morpholino, (lower alkyl)morpholino, e.g. N - methylmorpholino or 2-methylmorpholino, di(lower alkyl)morpholino, e.g. 2,3-dimethylmorpholino, (lower alkoxy)morpholino, e.g. ethoxymorpholino, thiamorpholino, (lower alkyl)thiamorpholino, e.g. N-methylthiamorpholino or 2-methylthiamorpholino, di(lower alkyl)thiamorpholino, e.g. 2,3-dimethylthiamorpholino, (lower alkoxy)thiamorpholino, e.g. 2-methoxythiamorpholino, piperazino, (lower alkyl)piperazino, e.g. $N^1$-methylpiperazino, 2-methylpiperazino or $N^1$-methylpiperazino, di(lower alkyl)piperazino, e.g. 2,3-dimethylpiperazino, hexamethyleneimino and homopiperazino. Nitrogen heterocyclics are preferred.

A few illustrations of the complete groups II and III are thus dimethylaminomethylamino, dimethylaminopropylamino, diethylaminoethylamino, diethylaminoethoxy, dimethylaminomethoxy, dipropylaminoethoxy, N-methyl - diethylamino, N-methyl-dimethylamino, piperidinopropylamino, piperidinoethylamino, morpholinopropylamino, pyrrolidinopropoxy, homopiperazinomethylamino, and the like.

The bases of Formula I form acid addition salts with the common inorganic and organic acids. Such inorganic salts as the hydrohalides, e.g. hydrobromide, hydrochloride, hydroiodide, sulfates, nitrates, phosphates, borates, etc., and organic salts as acetate, oxalate, tartrate, malate, citrate, succinate, benzoate, ascorbate, salicylate, theophyllinate, camphorsulfonate, alkanesulfonate, e.g. methanesulfonate, benzenesulfonate, toluenesulfonate and the like are also within the scope of the invention. The acid salt frequently provides a convenient means for readily isolating and obtaining pure product. The free base may then be obtained by neutralization, e.g. with sodium hydroxide.

The compounds of Formula I are produced in the following manner. 2-oxocyclooctaneacetic acid, or an alkyl ester thereof, is reacted with hydrazine, the latter preferably in the form of an acid salt such as the sulfate, in an alkaline medium such as alkali metal hydroxide, preferably with heating. The product of this reaction is 4,4a,5,6,7,8,9,10 - octahydrocyclooctal[c]pyridazine-3(2H)-one which is dehydrated, e.g. with bromine in glacial acetic acid, and moderate heating, to yield 5,6,7,8,9,10-hexahydrocycloocta[c]pyridazine-3(2H)-one. This last compound is halogenated, e.g. with a phosphorus oxyhalide, preferably phosphorus oxychloride or phosphorus oxybromide and at an elevated temperature up to reflux temperature, to obtain 3-halo-5,6,7,8,9,10-hexahydrocycloocta[c]pyridazine.

This last halogenated compound may then be converted to any of the products of Formula I. An aminoalkanol, preferably in the form of a salt such as an alkali metal salt and under heating, will effect the introduction of the group III. An aminoalkylamine under similar conditions will effect the introduction of the group II. Reaction of the halogenated cyclooctapyridazine with ammonia or an alkali metal hydrosulfide such as sodium hydrosulfide, preferably in an inert organic solvent such as ethanol at an elevated temperature up to reflux temperature, will result in the replacement of the halogen with the amino or thiol group, respectively.

Illustrative of aminoalkanols and aminoalkylamines which may be used to react with the halogenated cyclooctapyridazine are the following: 2-diethylaminoethanol, 3-dimethylamino-propanol, 2-piperidinoethanol, 4-(3-hydroxypropyl)morpholine 2-diethylaminoethylamine, 1-(3-aminopropyl)piperidine, 4 - (3-aminopropyl)morpholine, N,N,N'-trimethyl - 1,3-propanediamine 3-dimethylaminopropylamine, etc.

The compounds of this invention have a lowering effect on blood pressure and are useful in the treatment of hypertension. They may be administered orally or parenterally in the form of tablets, capsules, elixirs, injectables or the like by incorporating the appropriate dosage of a compound of Formula I or a physiologically acceptable acid addition salt thereof in a conventional vehicle according to accepted pharmaceutical practice.

The following examples are illustrative of the invention.

EXAMPLE 1

3 - (2-diethylaminoethoxy)-5,6,7,8,9,10 - hexahydrocycloocta[c]pyridazine, salt with one and one-half moles of oxalic acid (a) 4,4a,5,6,7,8,9,10 - Octahydrocycloocta[c]pyridazine-3(2H)-one.—A solution of 2-oxocyclooctaneacetic acid in 56 ml. of 0.9 N potassium hydroxide is mixed with a solution of 6.5 g. of hydrazine sulfate in 56 ml. of 0.9 N potassium hydroxide. This mixture is stirred on the steam bath for 3 hours. Upon cooling a solid separates which is collected, dried and recrystallized from isopropyl ether to give 4 g. (44%) of material melting between 101–103° C.

(b) 5,6,7,8,9,10 - hexahydrocycloocta[c]pyridazin - 3 (2H)-one.—A solution of 9 g. of 4,4a,5,6,7,8,9,10-octahydrocycloocta[c]pyridazin-3(2H)-one in 100 ml. of glacial acetic acid is stirred at 50° C. while 9 g. of bromine in 20 ml. of acetic acid is added over a period of 30 minutes. The mixture is stirred for 2 hours at 60° C. and cooled. The hydrobromide salt is filtered off, suspended in water and made alkaline with concentrated ammonium hydroxide. The solid is filtered off, dried, and recrystallized from 90 ml. of isopropanol to give 4.6 g. (52%) of material melting between 220–222° C.

(c) 3-chloro-5,6,7,8,9,10 - hexahydrocycloocta[c]pyridazine.—A mixture of 5 g. of 5,6,7,8,9,10-hexahydrocycloocta[c]pyridazin-3(2H)-one and 25 ml. of phosphorus oxychloride is refluxed for one hour. The cooled solution is poured onto crushed ice and made ammoniacal. The tan crystals are collected and recrystallized from 50% ethanol to give 3.1 g. (56%) of material melting between 51–53° C.

(d) 3-(diethylaminoethoxy) - 5,6,7,8,9,10-hexahydrocycloocta[c]pyridazine, salt with one and one-half moles of oxalic acid.—Three grams of 3-chloro-5,6,7,8,9,10-hexahydrocycloocta[c]pyridazine and 570 mg. of sodium in 40 ml. of 2-diethylaminoethanol are mixed and refluxed for 2 hours. The excess basic alcohol is removed on the steam bath at 10 mm. The residue is taken up in water and extracted with ether and dried. The ether extract continuing the free base is filtered and treated with 5 g. of oxalic acid in 40 ml. of ethanol. The solid is filtered off and recrystallized from 60 ml. of isopropanol to give 3.9 g. (61%) of material melting between 131–133° C.

EXAMPLE 2

3-(3-dimethylaminopropylamino) - 5,6,7,8,9,10 - hexahydrocycloocta[c]pyridazine, salt with two moles of oxalic acid Five grams of 3-chloro-5,6,7,8,9,10-hexahydrocycloocta[c]pyridazine and 35 g. of 3-dimethylaminopropylamine are reacted as described in Example 1 (d) to give 2.2 g. (20%) material melting between 145–147° C.

EXAMPLE 3

5,6,7,8,9,10-hexahydrocycloocta[c]pyridazine-3-thiol

Thre grams of 3-chloro-5,6,7,8,9,10-hexahydrocycloocta[c]pyridazine and 8 grams of sodium hydrosulfide in 30 ml. of 95% ethanol are stirred and refluxed for 6 hours. The mixture is poured onto 100 ml. of ice-water and neutralized with acetic acid to pH 6. The solid is filtered and recrystallized from 15 ml. of isopropanol to give 1.2 g. (41%) of a yellow crystalline material melting between 156–158° C.

EXAMPLE 4

3-amino-5,6,7,8,9,10-hexahydrocycloocta[c]pyridazine, salt with one-half mole of oxalic acid A mixture of 2.5 grams of 3-chloro-5,6,7,8,9,10-hexahydrocycloocta[c]pyridazine and 35 ml. of a saturated solution (at 0° C.) of ammonia in ethanol is heated in a sealed tube at 170° C. for 72 hours. The contents of the tube are evaporated. The residue is diluted with 20 ml. of water and made strongly alkaline with excess potassium carbonate and extracted with 2 x 50 ml. of ether. The ethereal layers are combined and dried. The mixture containing the free base is filtered and added to an ether solution containing an excess of oxalic acid. The solid is filtered and recrystallized from a methanol-ether mixture to give 0.5 g. (18%) of material melting between 259° and 261° C.

EXAMPLE 5

3-(3-piperidinopropoxy) - 5,6,7,8,9,10 - hexahydrocycloocta[c]pyridazine, salt with one and one-half moles of oxalic acid Three grams of 3-chloro-5,6,7,8,9,10-hexahydrocycloocta[c]pyridazine and 550 mg. of sodium in 30 ml. of 3-piperidinopropanol are reacted as in Example 1 (d) to give a crystalline material.

EXAMPLE 6

3-(4-morpholinopropylamino) - 5,6,7,8,9,10 - hexahydrocycloocta[c]pyridazine salt with two moles of oxalic acid Five grams of 3-chloro-5,6,7,8,9,10-hexahydrocycloocta[c]pyridazine and 30 grams of 4-(3-aminopropyl)-morpholine are reacted as described in Example 1 (d) to give a crystalline material.

EXAMPLE 7

3 - (3 - dimethylaminopropyl)methylamino - 5,6,7,8,9,10-hexahydrocycloocta[c]pyridazine, salt with two moles of oxalic acid Five grams of 3-chloro-5,6,7,8,9,10-hexahydrocycloocta[c]pyridazine and 30 grams of N,N,N'-trimethyl-1,3-propanediamine are reacted as in Example 1 (d) to give a crystalline product.

EXAMPLE 8

5,6,7,8,9,10-hexahydro - 3-[2-(hexahydro-1 - azepinylethylamino]cycloocta[c]pyridazine, salt with two moles of oxalic acid Five grams of 3-chloro-5,6,7,8,9,10-hexahydrocycloocta[c]pyridazine and 25 grams of 1-(2-aminoethyl)hexamethyleneimine are reacted as in Example 1 (d) to give a crystalline dioxalate.

What is claimed is:

1. A compound selected from the group consisting of bases of the formula

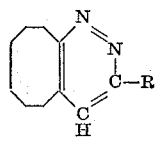

wherein R is a member of the group consisting of halogen, thiol, amino,

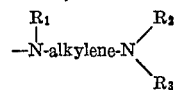

and

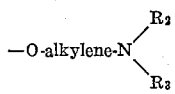

wherein $R_1$ is a member of the group consisting of hydrogen and lower alkyl, and $R_2$ and $R_3$ each is a member of the group consisting of hydrogen, lower alkyl, hydroxy-lower alkyl, phenyl-lower alkyl and together with the nitrogen to which they are attached form a member of the group consisting of piperidino, (lower alkyl)piperidino, di(lower alkyl)-piperidino, (lower alkoxy)piperidino, pyrrolidino, (lower alkyl)pyrrolidino, di(lower alkyl)pyrrolidino, (lower alkoxy)pyrrolidino, morpholino, (lower alkyl)morpholino, di(lower alkyl)morpholino, (lower alkoxy)morpholino, thiamorpholino, (lower alkyl)thiamorpholino, di(lower alkyl)thiamorpholino, (lower alkoxy-thiamorpholino, piperazino, (lower alkyl)piperazino, di(lower alkyl)piperazino, hexamethyleneimino and homopiperazino,
and acid addition salts of said bases.

2. A compound of the formula

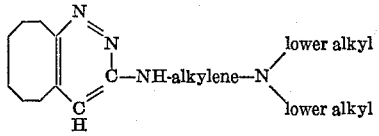

3. A compound of the formula

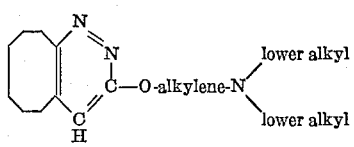

4. 3-(2-diethylaminoethoxy) - 5,6,7,8,9,10 - hexahydrocycloocta[c]pyridazine.

5. 3 - (3 - dimethylaminopropylamino) - 5,6,7,8,9,10-hexahydrocycloocta[c]pyridazine.

6. 5,6,7,8,9,10 - hexahydrocycloocta[c]pyridazine - 3-thiol.

7. 3-amino - 5,6,7,8,9,10 - hexahydrocycloocta[c]pyridazine.

8. 3 - halo - 5,6,7,8,9,10 - hexahydrocycloocta[c]pyridazine.

9. 3 - chloro - 5,6,7,8,9,10 - hexahydrocycloocta[c]pyridazine.

10. 5,6,7,8,9,10 - hexahydrocycloocta[c]pyridazin - 3-[2H]-one.

References Cited by the Examiner

UNITED STATES PATENTS 2,858,311  10/58  Steck _____ 260—250
2,927,112  3/60   Steck _____ 260—250
2,960,504  11/60  Druey et al. _____ 260—250

FOREIGN PATENTS 781,456   8/57  Great Britain.

NICHOLAS S. RIZZO, *Primary Examiner.*